INVENTORS
RICHARD J. HANSEN
FRANCIS M. McDONOUGH
BY
Robert B. Hughes
ATTORNEY

May 7, 1968  F. M. McDONOUGH ET AL  3,381,921
QUICK CHANGE SYSTEM FOR PASSENGER AND CARGO CARRYING AIRCRAFT
Filed Jan. 3, 1967  6 Sheets-Sheet 2

INVENTORS
RICHARD J. HANSEN
FRANCIS M. McDONOUGH
BY
Robert B. Hughes
ATTORNEY

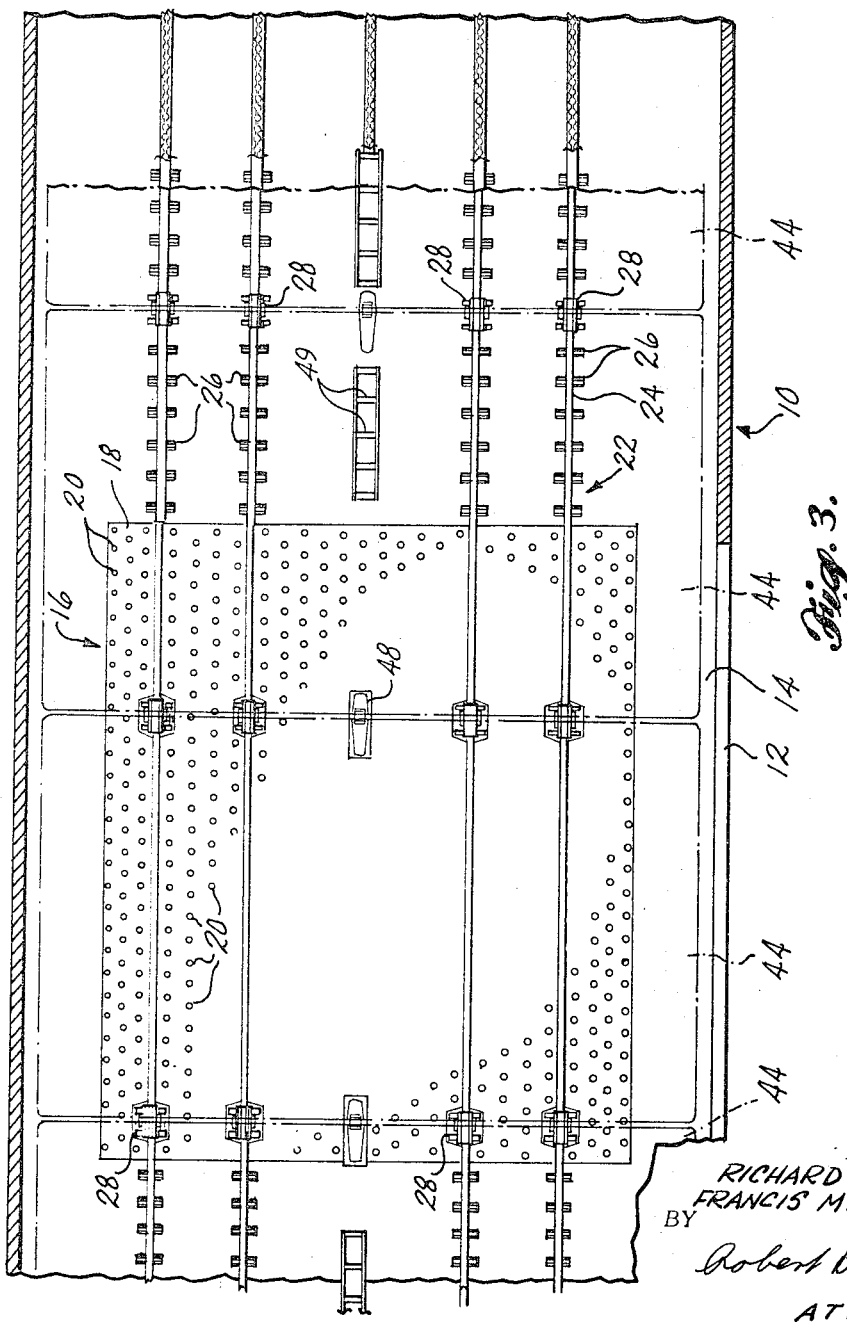

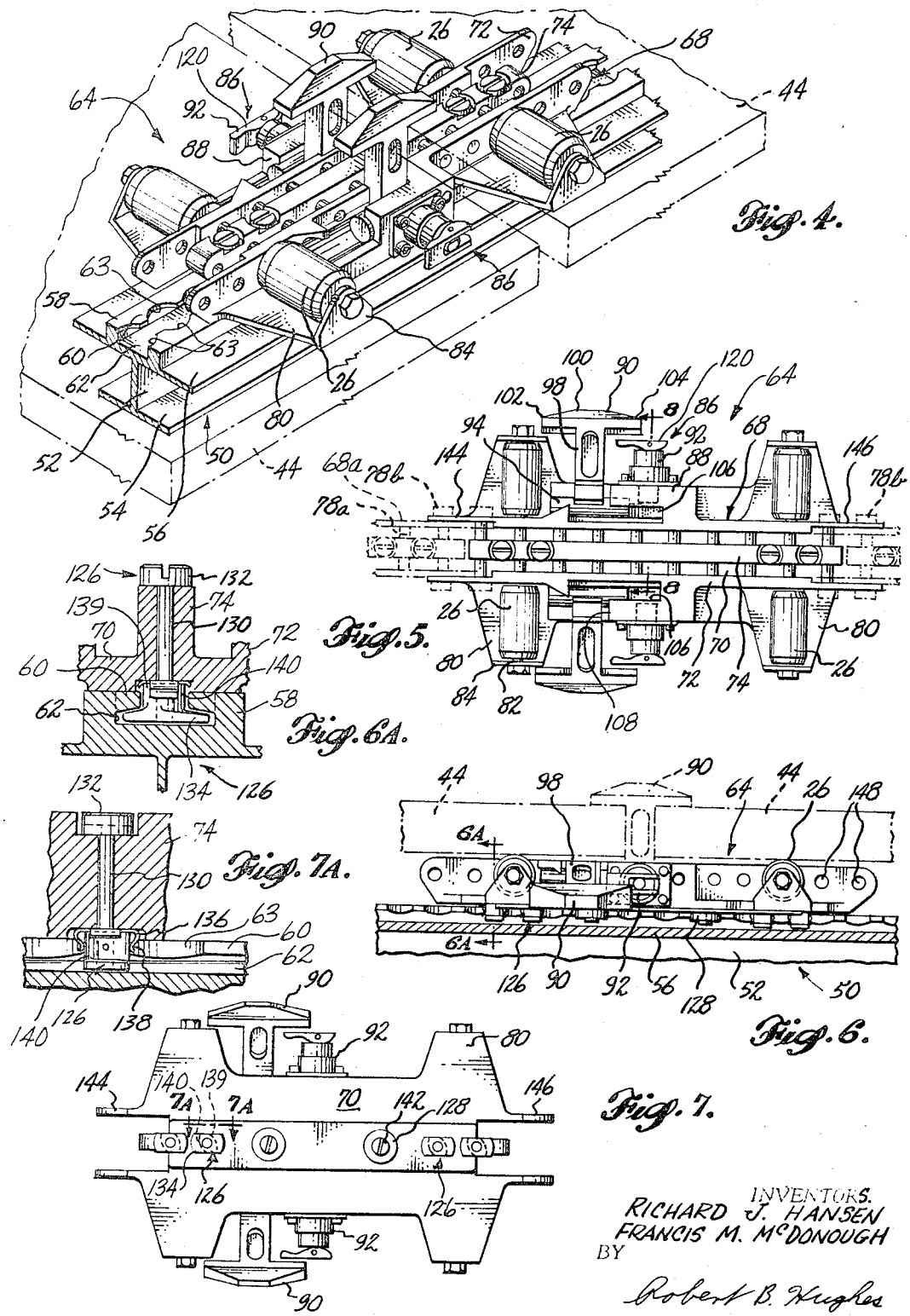

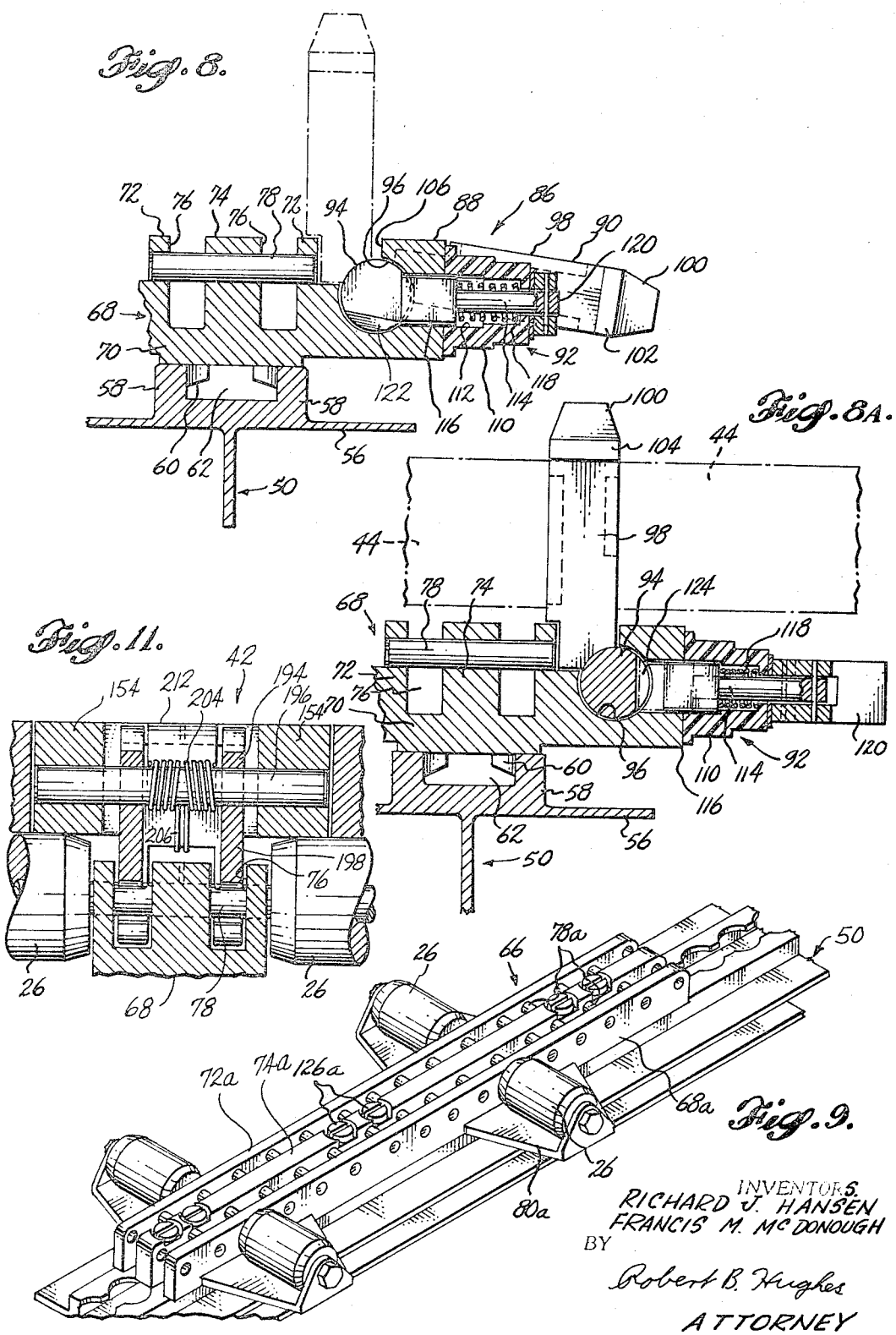

INVENTORS.
RICHARD J. HANSEN
FRANCIS M. McDONOUGH
BY Robert B. Hughes
ATTORNEY

United States Patent Office 3,381,921
Patented May 7, 1968

3,381,921
QUICK CHANGE SYSTEM FOR PASSENGER AND CARGO CARRYING AIRCRAFT
Francis M. McDonough, Bellevue, and Richard J. Hansen, Seattle, Wash., assignors to The Boeing Company, Seattle, Wash., a corporation of Delaware
Filed Jan. 3, 1967, Ser. No. 606,985
13 Claims. (Cl. 244—118)

ABSTRACT OF THE DISCLOSURE

A conveyor system comprising rail assemblies installed longitudinally in the floor of an aircraft and carrying conveying rollers for pallets; retractable cargo pallet locks in the floor of the aircraft; and seat pallets with latches mounted therein for gripping the rails of the conveyor system to hold the seat pallets in place.

Background of the invention (1) *Field of the invention.*—This invention relates to a cargo pallet and passenger seat pallet conveying and securing system adapted for use in an aircraft which must be able to be quickly converted from a cargo carrier to a passenger carrier and vice versa.

(2) *Description of the prior art.*—There are at present cargo pallet conveying and securing systems which comprise roller trays installed longitudinally in the floor of the aircraft, and cargo pallet locks which are either detachable from and/or retractable into the floor of the aircraft. Loaded cargo pallets are first moved into the aircraft through its doorway and then moved longitudinally within the aircraft to a desired location. The pallets are then secured in place with the cargo pallet locks. To unload the aircraft, the reverse of this operation is followed.

When it is desired to utilize the aircraft as a passenger aircraft, all or substantially all of the cargo conveying and securing apparatus is removed from the aircraft, and passenger seat units are moved into the airplane and locked to the seat tracks in the floor of the airplane. This change-over is a time consuming and cumbersome process and makes it economically unfeasible to use the airplane on alternate flights as a passenger carrier and a cargo carrier.

Summary of the invention

The present invention permits an airplane to be converted from a cargo carrier to a passenger carrier and vice versa in a very short time (e.g., in fifteen minutes or so). The advantages of such a system are many. For example, an aircraft can be a passenger carrying aircraft on an out flight (where the passenger traffic is heavy one way during a certain phase of a tourist season) and be converted to a cargo carrier for the return flight.

The apparatus of the present invention comprises a plurality of longitudinally aligned rail assemblies mounted in the floor of the airplane. Each rail assembly comprises an elongate base section carrying a plurality of seat pallet anchoring elements (i.e., transverse anchoring pins) which are located at closely spaced longitudinal intervals along substantially the entire length of the rail assembly. Each rail assembly also has a plurality of pallet conveying rollers which are located laterally of the seat pallet anchoring elements and spaced at suitable intervals longitudinally (e.g., about a half foot) so as to provide a substantially continuous pallet conveying surface or plane located just above the rail assembly.

A number of retractable cargo pallet locks are mounted to the base section at longitudinally spaced locations corresponding to the locations where the front and rear edge portions of cargo pallets are to be positioned in the airplane. Each cargo pallet lock is spaced laterally from the seat anchoring elements; in its retracted position it extends laterally from the base section below the pallet conveying plane, and it can be moved upwardly in a manner that lug portions thereof reach over the edges of two adjacent cargo pallets to secure the pallets in the aircraft. There are also a plurality of passenger seat pallets, each of which comprises a floor platform in which are mounted several seat latches arranged to fit within the platform and grip the anchoring elements of the rail assembly at substantially any desired location therealong. Within this conveying and securing system there are various specific features which are believed to be significant in the present invention, and these will be described hereinafter in detail.

For such a system to be practical for aircraft use, the apparatus must be lightweight and yet sufficiently strong to withstand heavy loading (e.g., up to 9 G loading) such as that which may occur in an emergency landing situation and to properly transmit these loads into the structure of the aircraft. Further, the apparatus must be reasonably compact in its height dimension so that maximum use may be made of the space within the fuselage of the airplane.

Another consideration is that there must be in the system a high degree of adaptability in the arrangement of seats in the airplane. For example, to equip some planes which are traveling a short, high passenger volume route with more seats, the spacing of the rows of seats must be a few inches less than usual. Or for some flights it may be desired to increase the number of seats in the first class accommodations area of the plane, where the spacing of the seats is greater than usual. So it is highly desirable that the system be such that the passenger seats be able to be located at substantially any desired location along the length of the passenger area of the airplane.

Thus, it may be stated as an object or objects of the present invention to provide such a "quick change" convertible cargo and passenger system especially adapted for aircraft use, which system embodies the various desirable features indicated previously herein.

These and other objects and features of the invention will be more readily understood and appreciated from the following detailed description of the preferred embodiment thereof selected for purposes of illustration and shown in the accompanying drawings, in which:

FIGURE 3 is a top plan view of the floor of the fuselage of the aircraft, showing in broken lines the location of cargo pallets in their secured position in the aircraft.

FIGURE 4 is an isometric view of a pallet lock subassembly of the present invention, with the cargo pallet lock being in its upstanding pallet engaging position and with a pair of cargo pallets being illustrated fragmentarily in broken lines in their secured position in the aircraft;

FIGURE 5 is a top plan view of a cargo pallet lock subassembly, with the pallet lock being in its retracted position;

FIGURE 6 is a side elevational view of the cargo pallet lock subassembly of FIGURE 5, indicating in broken lines the pallet lock in its upstanding position engaging a pair of cargo pallets;

FIGURE 6A is a sectional view taken on line 6A—6A of FIGURE 6;

FIGURE 7 is a bottom plan view of the cargo lock subassembly of FIGURE 5;

FIGURE 7A is a sectional view taken on line 7A—7A of FIGURE 7, but showing the locking foot rotated ninety degrees from its position in FIGURE 7, so as to be in its locking position;

FIGURE 8 is a fragmentary sectional view taken on line 8—8 of FIGURE 5, and illustrating in full lines the cargo pallet lock in its retracted position, and in broken lines the cargo pallet lock in its upstanding cargo engaging position;

FIGURE 8A is taken along the same line as FIGURE 8, but with the cargo pallet lock being shown in full lines in its upstanding cargo engaging position, and further illustrating in broken lines a cargo pallet being held thereby;

FIGURE 9 is an isometric view of a roller subassembly of the present invention;

FIGURE 11 is a transverse sectional view taken along line 11—11 of FIGURE 10;

It is believed that the present invention can best be represented by first describing generally the manner in which an airplane equipped with the apparatus of the present invention can be utilized as a passenger carrying or a cargo carrying aircraft, and then proceeding through a detailed description of the present invention.

Figure 1:
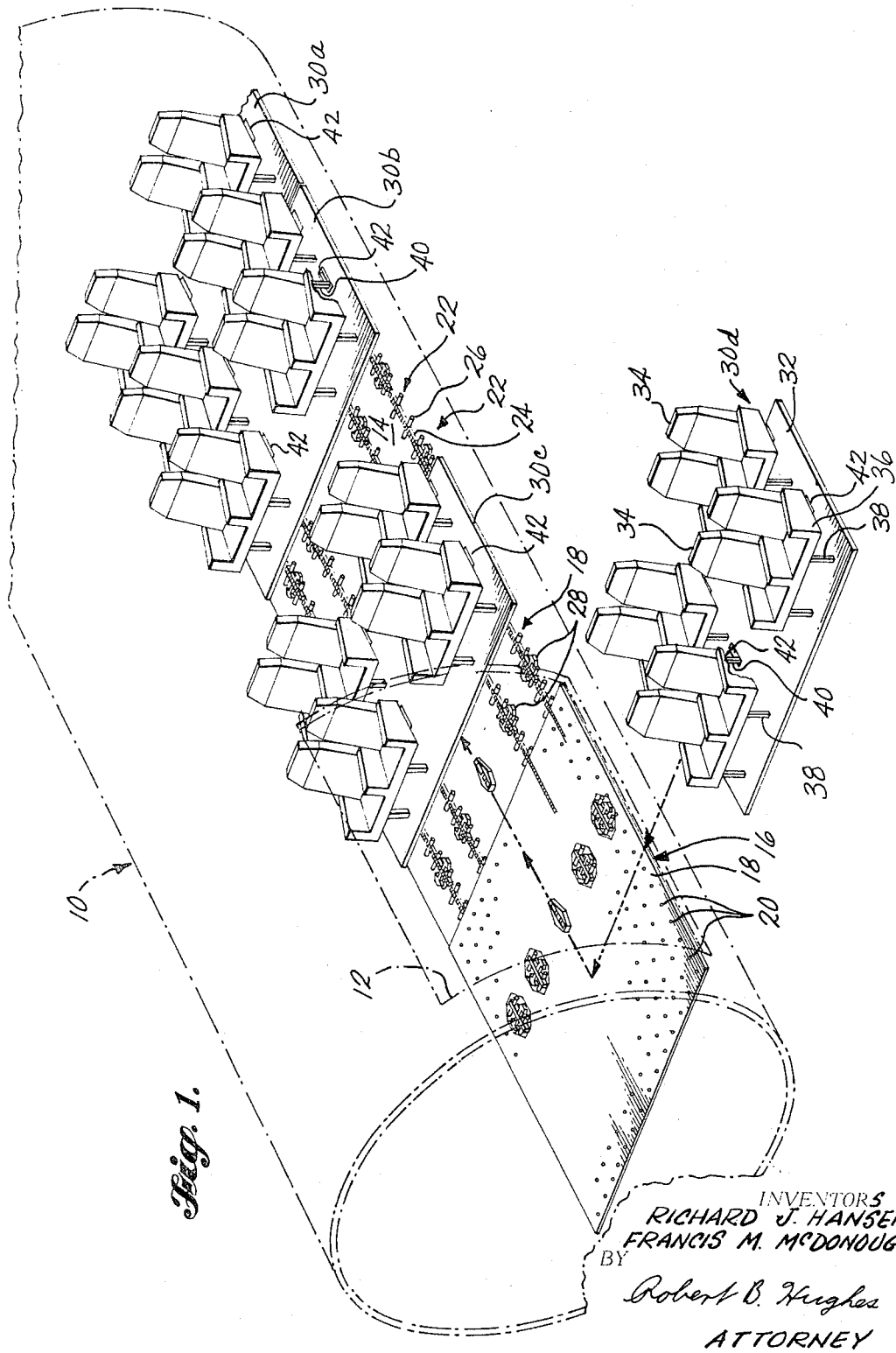
FIGURE 1 is an isometric view illustrating semi-schematically the rail assemblies of the present invention installed in the fuselage of an airplane, with passenger seat pallets being loaded into the airplane and being secured therein.

With reference to FIGURE 1, there is shown an airplane fuselage 10, having a side doorway 12 and a floor 14. The floor area adjacent the doorway 12 is provided with a ball mat 16, which comprises a base platform 18 in which are mounted a plurality of pallet supporting ball elements 20. These ball elements 20 are distributed over substantially the entire area of the base platform 18 and are mounted in such a manner that they are free to rotate about any axis, so that a pallet supported by these ball elements can be moved horizontally in any direction. (This ball mat 16 is or may be one of those that is presently used in the cargo conveying art.)

Mounted to the floor 14 of the aircraft and extending longitudinally thereof are a plurality (four, as shown herein) of rail assemblies 22. Each rail assembly 22 comprises a longitudinally extending base portion 24 to which is mounted along the entire length thereof at moderately spaced longitudinal intervals (e.g., of about a half foot) a plurality of rollers 26, with the rollers 26 of the several rail assemblies 22 defining collectively a conveying plane for cargo and passenger seat pallets. There are also for each rail assembly 22 a number of retractable cargo pallet locks 28 which are spaced longitudinally and located at positions corresponding to the location at which the rear edge of one cargo pallet is adjacent the front edge of a proximate cargo pallet. These cargo pallet locks 28 are ordinarily in a retracted position and are raised only when a related cargo pallet is in place, with the lock 28 then being brought up into its pallet locking position.

FIGURE 1 illustrates the manner in which passenger seat pallets are brought into and secured in the aircraft. These seat pallets, each of which is generally designated 30, each comprise a base platform 32 on which are mounted a plurality (four, as shown herein) of seat units 34. Each seat unit 34 comprises a unitary frame 36 having two forward and two rear legs 38 and 40, respectively. Mounted in the base platform 32 are a plurality of passenger seat pallet latches 42 by which the seat units 34 are secured to the base portions 24 of the several rail assemblies 22.

In FIGURE 1, there are shown two pasesnger seat pallets 30a and 30b which have been located in the aircraft in their desired locations, and the latches 42 have each been depressed to their engaged position to properly secure the pallets 30a and 30b to the aircraft. A third passenger seat pallet 30c has been placed within the aircraft and is being moved rearwardly therein to a location proximate the second seat pallet 30b, where it likewise will be secured to the aircraft by depressing its latches 42. A fourth seat pallet 30d is about to be moved laterally through the doorway 12 into the aircraft and then be moved rearwardly therein and secured in the same manner as the other seat pallets 30. (As mentioned previously herein, the ball mat 16 permits each seat pallet 30 to be moved laterally thereover as the seat pallet 30 is entering the aircraft, and then longitudinally onto the rail assemblies 22.) When it is desired to remove the passenger seat pallets 30 from the aircraft, the reverse operation is followed. That is to say, the seat pallet latches 42 are raised to their disengaged positions, and each seat pallet 30 is moved longitudinally to a location abreast of the doorway 12 and then moved over the ball mat 16 laterally through the doorway 12.

Figure 2:
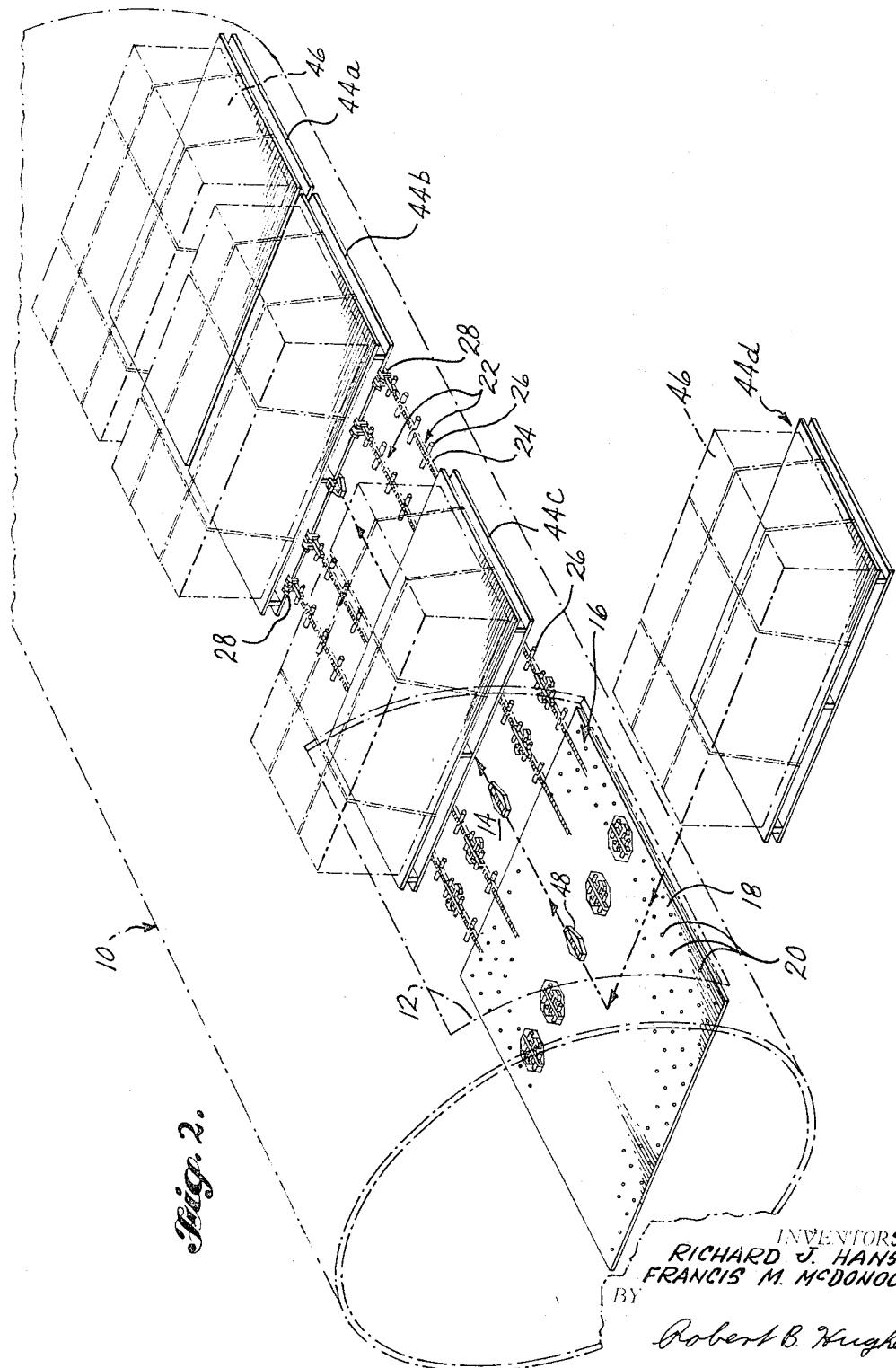
FIGURE 2 is a view similar to FIGURE 1, but showing loaded cargo pallets being moved into and secured within the fuselage of the airplane.
Figure 10:
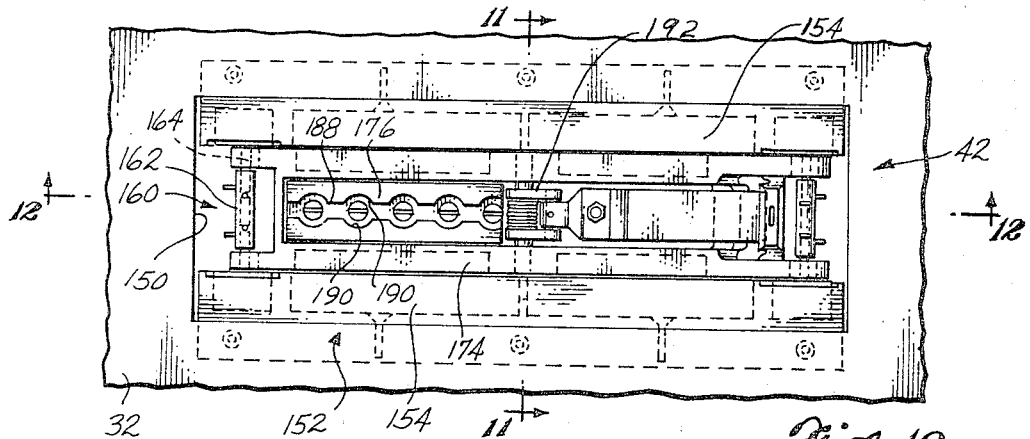
FIGURE 10 is a top plan view of a seat pallet latch of the present invention.
Figure 12:
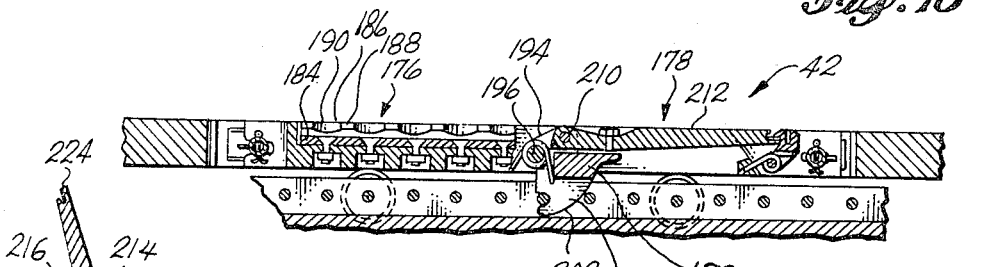
FIGURE 12 is a longitudinal sectional view taken along line 12—12 of FIGURE 10.
Figure 12A:
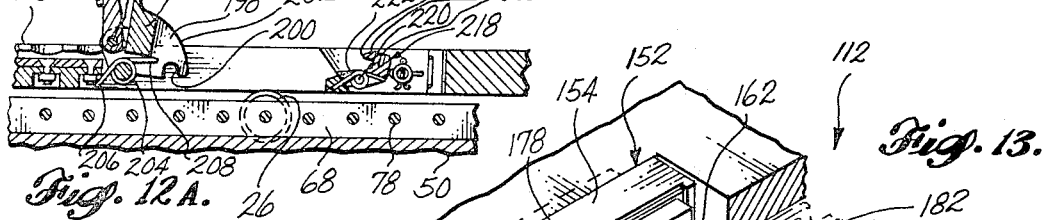
FIGURE 12A is a longitudinal sectional view taken along the same line as FIGURE 12, but showing the seat pallet latch in its unengaged position.
Figure 13:
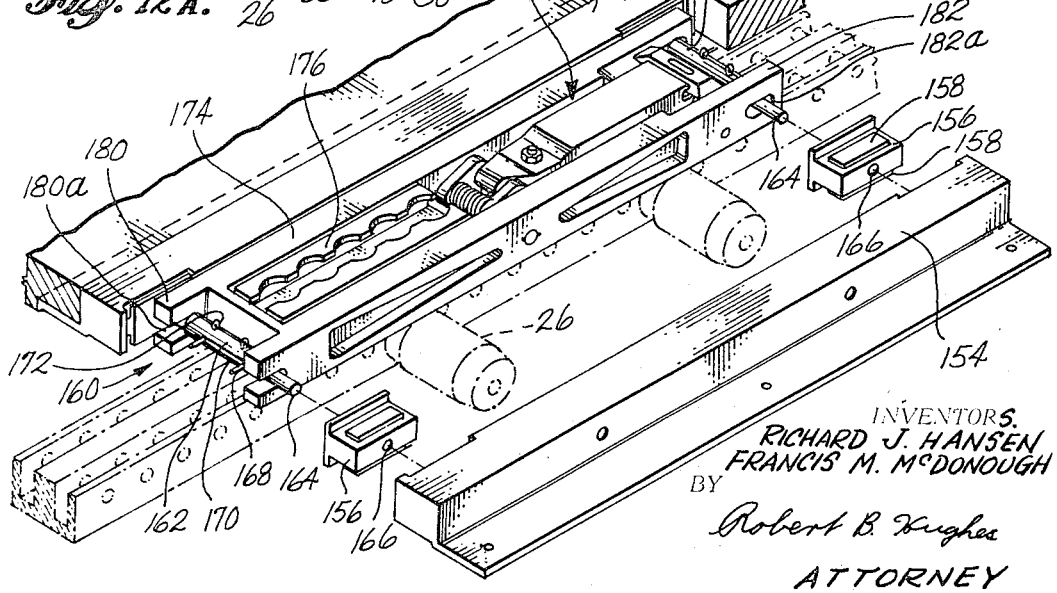
FIGURE 13 is an exploded isometric view of the seat pallet latch.

In FIGURE 2, there are shown four cargo pallets (these having the general designation 44) each of which has a cargo load 46 secured thereto. The first two cargo pallets 44a and 44b are shown having been moved into the aircraft and secured in their proper locations by cargo pallet locks 28. A third cargo pallet 44c is being moved rearwardly over the rail assemblies 22 to a location where the rear edge portion thereof comes into locking engagement with the pallet locks 28 which are engaging the front edge portion of the second cargo pallet 44b. As soon as this third cargo pallet 44c has reached its desired location, the next forward set of pallet locks 28 are raised to engage the front edge of this third cargo pallet 44c. A fourth cargo pallet 44d is about to be moved into the airplane.

While FIGURE 2 illustrates cargo pallets 44 being loaded only into the rear portion of the aircraft, it is to be understood that one or more cargo pallets 44 can also be positioned in that portion of the aircraft forward of the door 12. In this case, the last cargo pallet 44 to be loaded into the airplane will be positioned in the doorway 12, the cargo pallet locks 28 are accordingly provided in the ball mat 16. To enable this last pallet 44 to be moved to its proper location, the forward cargo pallet or pallets 44 (not shown) could be moved forwardly a short distance to permit some maneuvering room for this last cargo pallet 44, and then moved back to their appropriate locations. FIGURE 3 illustrates the airplane floor portion 14 proximate the doorway 12, with several cargo pallets 44 (indicated schematically in broken lines) being shown in their proper secured location within the aircraft in the vicinity of the doorway of the aircraft.

If desired, cargo pallet locks in addition to the locks 28 provided in the rail assemblies 22 can be provided. As shown herein, several such locks 48 are shown mounted along the center line of the airplane, each lock 48 being in transverse alignment with a related set of pallet locks 28. These locks 48 can be of a type shown in a copending United States patent application entitled "Retractable Cargo Securing Device," Ser. No. 599,312, filed on Dec. 5, 1966, and assigned to the assignee of the present invention. Also, additional rollers of a conventional configuration (indicated at 49 in FIGURE 3) can be provided.

In the preferred embodiment of the present invention, each of the rail assemblies 22 is so constructed as to be removably secured to a related one of the conventional seat tracks (shown at 50) which exist as part of the permanent floor structure of many present day passenger airplanes. These seat tracks comprise a longitudinally extending I beam composed of a vertical web 52, a lower flange 54 and an expanded upper flange 56. Secured to the upper surface of the top flange 56 are two laterally spaced longitudinal members 58, each of which has a respective inturned lip portion 60, the two lips 60 defining a longitudinal slot 62. At regular longitudinal intervals, the two lips 60 are formed with matching arcuate cutouts 63, with each pair of matching cutouts 63—63 defining a circular opening. (If the airplane were to be used exclusively as a passenger carrier, passenger seat units could, in a conventional manner, be secured directly to the seat tracks 50, in which case the quick change apparatus of the present invention would first be removed from the airplane. As will be disclosed hereinafter, this removal can conveniently be accomplished in a short time.)

Each of the rail assemblies 22 is made up of a plurality of subassemblies or units, which are of two types: (a) cargo lock units 64 and (b) conveyor units 66. In the following description, component parts which are common to both of the units 64 and 66 will be given like numerical designations, with an *a* subscript distinguishing those of the conveyor units 66.

In FIGURES 4 through 8A, there is shown a single cargo lock unit 64, comprising a segment 68 of the base portion 24 of one of the rail assemblies 22 of which each unit 64 forms a part. This base segment 68 is made up of a horizontally disposed longitudinal base plate or strip 70 which is integral with three upstanding flange portions, two side flanges 72 and a center flange 74. Thus, the three flanges 72 and 74 define with the base strip a pair of longitudinally extending, upwardly open channels 76.

Secured within and reaching between the upper portions of the side flanges 72 and extending through the center flange 74 are a plurality of transversely extending pin elements 78, which function to anchor the aforementioned seat pallet latches 42. These pins 78 are positioned at regular, closely spaced longitudinal intervals (i.e., about one inch) so that the location of the seat pallet latches 42 can be changed in correspondingly small increments of about one inch.

The base segment 68 has secured to each side thereof a pair of longitudinally spaced brackets 80, each of which carries a related conveying roller 26. To support a pair of adjacent rollers 26, a proximate one of the pin elements 78 is extended laterally in both directions to provide two axles 82, each of which carries a respective roller 26, with the outer end of each axle 82 being supported by an upstanding ear portion 84 at the outer end of its related bracket 80.

The cargo lock unit 64 has mounted to its base segment 68 one of the aforementioned cargo pallet locks 28. This lock 28 is made up of independently operable right and left portions 86 located laterally of and on opposite sides of the base segment 68. Each lock portion 86 comprises a lock housing 88, a lock head 90, and a lock pin unit 92. Each lock head 90 comprises a generally cylindrical base portion 94 which is mounted for longitudinal slide motion in a longitudinal cylindrical slot or bore 96 formed in the housing 88 at a location adjacent to the base segment 68. Fixed to the lock head base 94 and extending outwardly therefrom at right angles to the center axis thereof is a lock arm 98. A cargo securing lug 100 having forwardly and rearwardly pallet engaging nose portions 102 and 104, respectively, is fixedly secured to the outer end of the arm 98.

Each lock housing 88 is formed with a longitudinal slot 106 located immediately above and communicating with the housing bore 96. At the forward end of the slot 106 the side wall of the housing 88 is cut away to form a side slot 108 to accommodate the lock arm 98 in its retracted position wherein the arm 98 extends laterally from the lock housing 88. Thus, to move the lock head 90 from its retracted position to its cargo engaging position, the lug 100 with its associated arm 98 is swung upwardly (from the position shown in full lines in FIGURE 8) in the side opening 108 into registration with the slot 106 (to the position shown in broken lines in FIGURE 8), and then moved rearwardly with the base portion of the arm 98 moving into the rear portion of the slot 106, with the lock head 90 then being in its cargo pallet securing position.

To hold the lock head 90 in its cargo securing position, there is provided the aforementioned securing pin unit 92. This securing pin unit comprises a pin housing 110 formed with a stepped cylindrical bore 112 to accommodate a related pin 114, which has an expanded locking head portion 116. This pin housing 110 is secured to the side of its related lock housing 88 in a manner that the stepped bore 112 communicates with, and is disposed at right angles to, the lock head bore 96. A compression spring 118 is mounted about the pin 114 within the stepped bore 112 to urge the head portion 116 of the securing pin 114 into the lock housing bore 96. The outer end of the pin 114 is provided with a cam finger 120 to limit the travel of the head portion 116 into the bore 96, and also to enable the pin securing head portion 116 to be withdrawn from the lock housing bore 96 (as in FIGURE 8A).

As shown in FIGURE 8A, the outer rear edge portion of each lock head base 94 is beveled as at 122 (the term "outer" being referenced to the lock head 90 in its upright position), so that as the lock head 90 is pushed rearwardly, the beveled surface 122 pushes its related securing pin outwardly from the lock housing bore 96. The middle outer side portion of the lock head base 94 is formed with a re-entrant rectangular cutout 124, which, when the lock head 90 has reached its furthest rearward position, comes into registration with the securing pin 114. At this instant, the spring 118 urges the securing head 116 into the cutout 124 to prevent any longitudinal movement of the lock head 90. In this location, the lock head 90 is held securely in its upright position by the lock housing 88 and by the securing pin head 116 (as in FIGURE 4). To move the lock head 90 to its retracted position, the cam finger 120 is operated to retract the securing pin 114 (as in FIGURE 8A) and permit the lock head to be slipped forwardly so that the arm 98 comes into registration with the side opening 108 and can then be swung outwardly and downwardly to its laterally extending retracted position (as shown in full lines in FIGURE 8).

To mount each cargo lock unit 64 to the seat track 50, the forward and rear ends of the aforementioned center flange 74 are each provided with two mounting units 126, and the center portion of the flange 74 is provided with two mounting plugs 128. Each mounting unit 126 comprises a vertical leg portion 130, the upper end of which is formed with a slotted head 132, and the lower end of which is formed with a foot portion 134 to fit into a related slot portion 62 of the seat track 50. The width of each foot 134 is slightly less than the minimum distance between the two lip portions 60 of the slot defining members 58, and the length of each foot 134 is greater than the distance between the lips 60, but slightly less than the width of the slot 62. Thus, each foot 134, when longitudinally aligned, can be slipped down between the lips 60 and then turned 90 degrees so that the protruding ends of the foot 134 will be lodged within the slot 62 and beneath the lips 60.

To hold each mounting unit 126 in its securing position (i.e., with the foot 134 extending laterally beneath the lips 60), there is provided at the bottom portion (i.e., ankle portion) of the leg 130 a retaining spring 136, having two arm portions 138 which press against the forward and rear surfaces of the ankle portion 139 of the leg 130. The ankle 139 has two diametrically opposed, moderately protruding nubs 140 disposed at a 45° angle to the major axis of the foot 134. The diameter across these nubs 140 is moderately greater than the width between lips 60. Thus, when the foot 134 is situated in the slot 62, these nubs 140 permit the leg 130 to be turned only 90° and in a direction so that the nubs 140 move against the spring arms 138 to push these arms outwardly. At the completion of this 90° rotation, the spring arms 138 press against the ankle portion 139 adjacent the nubs 140 so as to resist counter-rotation of the leg 130 and thus hold the foot 134 yieldingly in its securing position.

The aforementioned plugs 128 are secured by screws 142 to the bottom of the aforementioned center flange 74 in a manner to protrude a moderate distance downwardly from the base 68. Each plug 128 is so positioned that it fits into a related opening 63—63 in the seat track 50, with each mounting unit 126 being located intermediate of two adjacent sets of openings 63—63. Thus, these plugs 128 function to locate the cargo lock unit 64 and to carry lateral loading that is imposed thereon.

To secure each cargo lock unit 64 to the seat track 50, the mounting units 126 are turned so that the feet portions 134 thereof are longitudinally aligned, and the unit 64 is placed onto the track 50 with the plugs 128 fitting into the seat track openings 63—63. Then a screwdriver or similar tool is used to engage the slotted heads 132 of the mounting units 126 to rotate the legs 130 of the units 126 90° to turn the feet 134 laterally to reach beneath the lips 60 of the seat track 50. As previously described, the action of the springs 136 yieldingly holds the feet 134 in their laterally extending securing position.

FIGURE 9 illustrates one of the aforementioned conveying subassemblies or units 66. This unit 66 is substantially the same as the cargo lock unit 64, except that the unit 66 is not provided with a cargo pallet lock 28. Thus, each conveyor unit 66 comprises a base portion segment 68a, pin elements 78a mounted thereto, roller brackets 80a carrying rollers 26, and mounting units 126a. These components are similar both in construction and in function to corresponding components in the cargo lock units 64 bearing the same numerical designations.

The forward and rear end portions of the side flanges 72 of the cargo lock units 64 and of selected ones of the conveyor units 66 are spaced outwardly a very moderate distance (at 144 and 146, respectively) to accommodate a related end portion of the base segment 68a of a proximate conveyor unit 66. (This is illustrated in FIGURE 5.) Thus, a pair of end members 144 or 146 form with an end portion of a base segment 68a a lap joint, having pairs of register holes 148 through which connecting pins 78b are inserted to join the cargo lock unit 64 to the conveyor unit 66. Each such pin 78b is disposed similarly to corresponding pin elements 78 and 78a, so that the pins 78b can also serve an anchoring function for the seat pallet latches 42, in addition to joining the units 64 and 66.

To install the rail assemblies 22 in the aircraft, a number of cargo lock units 64 and conveyor units 66 are placed in end-to-end relationship along the length of each seat track 50, with the end portions 144 and 146 of each cargo lock unit 64 lapping end portions of the base segments 68a of the proximate conveyor units 66. Since the spacing of the cargo locks 28 is the same as the longitudinal spacing of the cargo pallets 44, usually several conveyor units 66 will be placed in lengthwise relationship adjacent one another between successive lock units 64 in a rail assembly 22. The mounting plugs 128 and 128a of the units 64 and 66 are positioned in openings 63—63 of the members 58 of the seat track 50. Then a screwdriver or similar tool is used to engage the slotted head 134 of each of the leg portions 130 of the mounting units 126 and 126a of the units 64 and 66, and these legs 130 are each turned 90° so that the units 64 and 66 are locked to the seat tracks 50. Pin elements 78b are inserted through each set of matching holes 148 to secure the units 64 and 66 one to another. The length of the cargo lock units 64 and conveyor units 66 are so selected initially, and the units 64 and 66 are so arranged, that the cargo lock units 64 are positioned at locations corresponding to the locations where the front and rear edge portions of proximate cargo pallets 44 of a predetermined size will be adjacent one another in their final loaded positions. Thus, the cargo pallet locks 28 will be in the proper position to grip the front and rear edge portions of adjacent cargo pallets 44.

It will be noted that with the units 64 and 66 in place along the length of each of the seat tracks 50, a substantially continuous rail assembly 22 is provided over each seat track 50. Rollers 26 are located at regularly spaced longitudinal intervals along each rail assembly 22 to provide a substantially continuous pallet conveying surface, and pin elements 78, 78a and 78b are provided at one inch intervals along substantially the entire length of each rail assembly 22. When the cargo pallets 44 are in their secured position within the airplane, the forces that the cargo pallets 44 exert on the lock heads 90 will be transmitted to the base segments 68 and through the mounting units 126 and plugs 128 into the seat tracks 50 of the airplane. Also, since cargo pallets 44 and/or passenger seat pallets 30 will oftentimes be positioned over the ball mat 16, the mat is provided with cargo locks 28 and pin elements 78.

FIGURES 10 through 13 illustrate one of the seat latches 42 of the present invention. Each latch 42 is mounted in a respective rectangular cutout 150 in its respective base platform 32 of one of the passenger seat pallets 30, and comprises a housing 152 made up of two side frames 154, each of which is secured to a respective one of the two edge portions of the pallet platform 32 adjacent the cutout 150. A forward and rear insert 156, provided with upper and lower pads 158, is mounted in each side frame 154. Mounted to and extending between both the front set and rear set of inserts 156 is a forward and rear mounting pin assembly 160. Each pin assembly 160 comprises a center sleeve 162 in which are mounted two laterally extending fingers 164, each of which fits into a hole 166 and a respective insert 156. So that each finger 164 can be conveniently pushed into or withdrawn from its related hole 166, there is a tip 168 extending outwardly from the base of the finger 164 and through a slot 170 in the sleeve 162. A pair of cotter pins 172 are provided to hold the fingers 164 in their engaged position in the inserts 156.

Located between the two housing frames 154 and reaching between the pin assemblies 160 and mounted thereto is a seat pallet base frame 174 which carries at the forward end thereof a seat leg receptacle 176 and at the rear portion thereof a hook assembly 178. The base frame 174 has a pair of forward and rear arms 180 and 182, respectively, having related slots 180a and 182a to engage, respectively, front and rear pin assemblies 160. The length of the slots 180 and 182 is approximately a half inch longer than the diameter of the pin assemblies 160, so that the base frame 174 can slide longitudinally on the pin assemblies 160 about a half inch.

The aforementioned seat leg receptacle 176 is similar in construction to a segment of the upper portion of the seat track 50 and thus comprises a base portion 184 having two upstanding side members 186, each having an inturned lip 188. Each lip 188 is formed with matching arcuate cutouts 190, with each matching pair of cutouts 190 defining a circular opening. Each rear leg 40 of the seat units 34 fits into a selected one of these circular openings 190—190 of the seat leg receptacle 176 of its related latch 42. Each rear seat unit leg 40 is provided with a conventional locking mechanism (not shown) to secure it to its receptacle 176 (this being accomplished in the same manner in which seat legs are usually secured to a conventional seat track, such as the one illustrated herein at 50).

The aforementioned hook assembly 178 comprises a hook member 192 having two ears 194 by which it is pivotally mounted to a transverse pin 196 within the base frame 174. The hook member 192 has two depending arm members 198, each of which is arranged to fit into a related one of the two channels 76 defined by the flanges 72 and 74 of the rail assemblies 22. The forward edge of each arm 198 is formed with a re-entrant cutout 200 to receive a selected one of the anchoring pin elements 78 of the assembly 22. The rear edge 202 of each foot member 192 is curved in such a manner that when the hook member 192 is depressed so that the two arm cutouts 200 engage one anchoring pin 78, their two rear edges 202 engage the immediately adjacent rear anchoring pin 78, with the result that the hook member 192 is held tightly to its related rail assembly 22. The hook member 192 is urged upwardly to its disengaged position by means of a spring member 204 coiled around the pin 196 and having two arms 206 and 208 pressing one against the base frame 174 and the other against the hook member 192.

Mounted between the two hook member ears 194 a short distance from the pin 196 is a second pin 210, by which a latch handle 212 is pivotally mounted. Near the root end of the handle 212 (i.e., that end by which it is mounted to the pin 210) there is threaded in the handle 212 an adjustable bearing screw 214 having a lock nut 216. When the handle 212 is swung downwardly, the lower end of the bearing screw 214 bears against the hook member 192 to force it into engagement with a set of anchoring pins 78. The bearing screw 214 can be adjusted in the handle 212 to insure a snug fit between the hook member 192 and the anchoring pins 78.

To hold the handle 212 in its horizontally extending latch securing position, there is provided a handle lock 218 pivotally mounted to a pin 220 at the rear end of the frame 174. A spring 222 is coiled about the pin 220 to urge the lock 218 upwardly and forwardly to its handle engaging position. When the handle 212 is pushed downwardly, the outer end 224 of the handle 212 engages a beveled surface 225 of the handle lock 218 to push the lock 218 rearwardly a short distance. When the handle 212 reaches its fully depressed position, the lock 218 springs forward so that a hook portion 226 thereof grips the handle tip 224 to hold the handle 221 in its latch securing position. The lock 218 is provided with a slot 228. When it is desired to release the latch handle 212, a screwdriver or similar tool is inserted into the slot 228 to tilt the lock rearwardly and permit the handle 212 to spring up to its release position.

When a passenger pallet 30 has been moved to its desired location, each of the handles 212 of the several latches 42 is depressed so that the hook member 192 of each latch 40 engages a pair of anchoring pins 78 in the rail assembly 22. Since the latch base frame 174 is permitted to slide forwardly and rearwardly a small amount on its pin assemblies, the base frame 174 can be shifted a short distance so that the hook member 192 properly engages a set of anchoring pins 78. Thus, any loads on the seat units 34 will be transmitted through the rear legs 40 thereof directly into the latch members 42 and through the rail assemblies 22 to the seat tracks 50.

To summarize the overall operation of the present invention, the rail subassemblies 64 and 66 are secured to the seat tracks 50 of the airplane to form the rail assemblies 22, and remain in the airplane so long as it is frequently being converted from a passenger carrier to a cargo carrier and vice versa. The cargo locks 28 are normally in a retracted position and always remain so when the airplane is used as a passenger carrier. To prepare the plane for use as a passenger carrier, passenger seat pallets 30 are moved into the airplane and are secured to the rail assemblies 22 by means of the latches 42. To convert the airplane to cargo use, the latches 42 are disengaged and the seat pallets 30 are removed. Then cargo pallets 44 are moved into the airplane, as previously described with reference to FIGURE 2. As each cargo pallet 44 is brought into its secured position, its related rearward set of locks 28 have already been raised to an upstanding pallet engaging position, and then its related forward set of locks 28 is brought into engagement with the front edge of the pallet 44 as previously described. Then another pallet is brought into position to engage the locks 28 which have just been raised. In this manner, the entire airplane can be loaded. Although not shown herein, conventional side guides can be provided along each side of the airplane floor 14 to restrain lateral motion of the pallets. To convert back to passenger use, the cargo pallets 44 are removed, as previously described, and passenger pallets 30 are moved into the aircraft.

We claim:

1. Securing and conveying apparatus for a convertible passenger seat pallet carrying and cargo pallet carrying airplane, said apparatus comprising:
   (a) a plurality of longitudinally extending floor rail assemblies, each of said rail assemblies comprising:
      (1) a longitudinal base frame,
      (2) a plurality of seat pallet anchoring elements mounted to said frame and located at longitudinally spaced intervals along its related rail assembly,
      (3) said anchoring elements being spaced at intervals corresponding to predetermined increments of adjustment of passenger seat location,
      (4) a plurality of roller elements positioned at longitudinally spaced intervals along its related rail assembly and spaced laterally from the anchoring elements of its related rail assembly, and
      (5) said roller elements collectively defining a pallet conveying plane located above said seat pallet anchoring elements,
   (b) a plurality of cargo pallet locks mounted to said rail assemblies, said cargo pallet locks being:
      (1) located along said rail assemblies at longitudinally spaced intervals corresponding to the locations of proximate front and rear edge portions of adjacent cargo pallets of a predetermined configuration,
      (2) spaced laterally from the anchoring elements of its related rail assembly, and
      (3) movable from a retracted position below said conveying plane to a cargo pallet securing position above said conveying plane,
   (c) a plurality of passenger seat pallets comprising a pallet platform having a lower surface by which it is moved longitudinally over said roller elements, and
   (d) a plurality of passenger seat pallet latches mounted to each passenger seat pallet and movable from a retracted position above the lower surface of said platform to a securing position below said platform lower surface, where said latches engage selected anchoring elements of the rail assemblies.

2. The apparatus as recited in claim 1, wherein each of said cargo pallet locks has at least one cargo lock portion comprising:
   (a) a lock housing mounted to the base frame of said rail assembly,
   (b) a lock head having a root end which is mounted for longitudinal slide motion in said lock housing and swing motion about a longitudinal axis, a swing end having a cargo pallet engaging lug portion, and an intermediate arm portion,
   (c) a lateral opening in said housing to accommodate said arm portion, whereby said lock head can be swung from a laterally extending retracted position to an upstanding position,
   (d) a longitudinal slot in said housing communicating with said side opening, whereby said lock head can be moved longitudinally in its upstanding position to a cargo pallet securing position, and
   (e) lock head securing means to hold said lock head in its cargo pallet securing position.

3. The apparatus as recited in claim 2, wherein said lock head securing means comprises a retractable pin extending into said lock housing, and spring means to urge said pin into locking engagement with said lock head to prevent longitudinal movement of said lock head, and wherein said housing engages side portions of said lock head in its cargo pallet securing position in a manner to prevent lateral motion of said lock head.

4. The apparatus as recited in claim 1, wherein said anchoring elements comprise a plurality of transversely extending anchoring pin members which are longitudinally spaced at equal intervals, and said passenger seat pallet latches each comprise a base frame having a hook member swing mounted thereto, said hook member being movable from an upper retracted position downwardly to an anchoring pin engaging position.

5. The apparatus as recited in claim 4, wherein each of said hook members has a front hook portion and a back contact surface so contoured that as said hook portion engages a selected one of said anchoring pin members, said back contact surface comes into engagement with an adjacent anchoring pin member in a manner that said hook member is securely held between these two anchoring pin members.

6. The apparatus as recited in claim 4, wherein the base frame of said rail assembly has at least two upstanding side flanges which define upwardly open channel means, and said anchoring pin members extend between said side flanges and across said channel means, with the hook members of said passenger pallet latches fitting within said channel means when said hook members are in locking engagement with said anchoring pin members.

7. The apparatus as recited in claim 6, wherein the base frame of each rail assembly is also formed with a center flange which defines with the two side flanges two upwardly open channels, each of said hook members comprises two hook elements, each of which reaches into and fits within a related one of the channels, and said anchoring pin members extend across both of said channels.

8. The apparatus as recited in claim 7, wherein the base frame of each rail assembly has a plurality of rail securing units mounted within said ecnter flange and adapted to engage a related seat track in the airplane floor; each of said securing units comprising a leg extending through said center flange and rotatable therein, a securing foot secured to the lower end of said leg and extending outwardly therefrom, and an exposed head at the upper end of said leg by which said leg can be turned, whereby said foot can be placed in a related seat track and be turned to be secured to the seat track.

9. The apparatus as recited in claim 8, wherein said leg has an ankle portion with protruding means disposed at about forty-five degrees to said foot whereby rotation of said foot within an airplane seat track is limited by engagement of said protruding means with seat track, and there is spring means engaging said securing unit to yieldingly resist rotation of said securing unit, whereby said securing unit is yieldingly held in a securing position.

10. The apparatus as recited in claim 9, wherein there are mounting plugs mounted to the lower portion of the base frame of each rail assembly, which mounting plugs are adapted to fit into selected openings of a related seat track of the airplane, said plugs being so arranged with respect to related rail securing units that with said plugs fitting into seat track openings, said rail securing units are spaced longitudinally from other of the seat track openings.

11. The apparatus as recited in claim 4, wherein each passenger seat pallet latch has an operating handle swing mounted by one end to its related hook member, said handle being upstanding with the latch in its unengaged position and horizontally disposed with the pallet platform latch in its engaged position, said handle having adjustable hook member engaging means, whereby the locking position of the hook member can be adjusted with respect to the handle in its horizontally engaging position.

12. The apparatus as recited in claim 4, wherein the base frame of each of said latches has passenger seat leg mounting means adapted to receive in locking relationship a related passenger seat leg, and the base frame of each latch is mounted within the passenger seat in a manner to permit an increment of longitudinal motion therebetween, said increment being equal to at least about half of the longitudinal intervals of spacing of said anchoring pin members.

13. The apparatus as recited in claim 1, wherein:
(a) said longitudinal base frame comprises two upstanding side flanges and an upstanding center flange, which three flanges define two upwardly open channels,
(b) said seat pallet anchoring elements comprise anchoring pin members which are spaced longitudinally at equal intervals, and which extend transversely between said flanges and across said channels,
(c) each of said cargo pallet locks comprises two portions located on opposite sides of the base frame of its related rail assembly and comprising:
 (1) a lock housing mounted to the base frame of said rail assembly,
 (2) a lock head having a root end which is mounted for longitudinal slide motion in said lock housing and swing motion about a longitudinal axis, a swing end having a cargo pallet engaging lug portion, and an intermediate arm portion,
 (3) a lateral opening in said housing to accommodate said arm portion, whereby said lock head can be swung from a laterally extending retracted position to an upstanding position,
 (4) a longitudinal slot in said housing communicating with said side opening, whereby said lock head can be moved longitudinally in its upstanding position to a cargo pallet securing position, and
 (5) lock head securing means to hold said lock head in its cargo pallet securing position,
(d) each of said passenger seat pallet latches comprises a hook member having two hook elements to fit into a respective one of said channels, each hook element having a front hook portion to engage a selected one of said anchoring pin members and a back contact surface so contoured that as its related hook portion engages the selected anchoring pin member, said back contact surface comes into engagement with an adjacent anchoring pin member in a manner that said hook member is securely held between these two anchoring pin members,
(e) each passenger seat pallet latch has passenger seat leg mounting means adapted to receive in locking relationship a related passenger seat leg, and
(f) each passenger seat latch having a base frame to which its passenger seat leg mounting means and its hook member are mounted, and said base frame is mounted to its related passenger seat pallet in a manner to permit an increment of longitudinal motion therebetween, said increment being equal to at least about half of the longitudinal intervals of spacing of said anchoring pin members.

References Cited

UNITED STATES PATENTS

| | | | |
|---|---|---|---|
| 2,605,064 | 7/1952 | Davis | 244—118 |
| 3,182,608 | 5/1965 | Mollon | 244—118 X |
| 3,262,588 | 7/1966 | Davidson | 214—84 |

MILTON BUCHLER, *Primary Examiner.*

T. W. BUCKMAN, *Assistant Examiner.*